US009660812B2

(12) United States Patent
Rowley (10) Patent No.: US 9,660,812 B2
(45) Date of Patent: May 23, 2017

(54) PROVIDING INDEPENDENT VERIFICATION OF INFORMATION IN A PUBLIC FORUM (75) Inventor: Peter Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 2672 days.

(21) Appl. No.: 11/680,049

(22) Filed: Feb. 28, 2007

(65) Prior Publication Data
US 2008/0209218 A1 Aug. 28, 2008

(51) Int. Cl.
G06Q 20/00 (2012.01)
H04L 9/32 (2006.01)
H04L 29/08 (2006.01)
H04L 29/06 (2006.01)

(52) U.S. Cl.
CPC .......... *H04L 9/3247* (2013.01); *H04L 63/126* (2013.01); *H04L 67/306* (2013.01); *H04L 63/0442* (2013.01)

(58) Field of Classification Search
USPC .......................................................... 705/76
See application file for complete search history.

(56) References Cited

U.S. PATENT DOCUMENTS

| 6,289,460 | B1 * | 9/2001 | Hajmiragha ..................... 726/28 |
| 6,351,811 | B1 * | 2/2002 | Groshon et al. ............. 713/176 |
| 6,425,011 | B1 * | 7/2002 | Otani et al. ..................... 709/225 |
| 6,463,534 | B1 * | 10/2002 | Geiger et al. ................. 713/168 |
| 6,499,105 | B1 * | 12/2002 | Yoshiura et al. ............. 713/176 |
| 6,615,258 | B1 * | 9/2003 | Barry et al. ................... 709/223 |
| 6,632,248 | B1 * | 10/2003 | Isaac et al. .................... 715/273 |
| 6,957,199 | B1 * | 10/2005 | Fisher .............................. 705/78 |
| 7,143,284 | B2 * | 11/2006 | Wheeler et al. .............. 713/155 |
| 7,630,986 | B1 * | 12/2009 | Herz et al. | |
| 7,730,321 | B2 * | 6/2010 | Gasparini et al. ............ 713/182 |
| 2002/0029194 | A1 * | 3/2002 | Lewis et al. ..................... 705/39 |
| 2002/0031230 | A1 * | 3/2002 | Sweet et al. ................... 380/278 |
| 2002/0112162 | A1 * | 8/2002 | Cocotis et al. ............... 713/176 |
| 2002/0124172 | A1 * | 9/2002 | Manahan ....................... 713/176 |
| 2003/0028493 | A1 * | 2/2003 | Tajima et al. ................... 705/67 |
| 2003/0046551 | A1 * | 3/2003 | Brennan ........................ 713/185 |
| 2003/0084294 | A1 * | 5/2003 | Aoshima et al. ............. 713/169 |
| 2004/0015690 | A1 * | 1/2004 | Torigai et al. ................ 713/156 |
| 2004/0030887 | A1 * | 2/2004 | Harrisville-Wolff et al. 713/155 |

(Continued)

OTHER PUBLICATIONS

Home Page, www.buyerleverage.com. [Online]. BuyerLeverage Corporation, Feb. 2, 2007. Retrieved from the Internet: <URL: http://web.archive.org/web/20070203011009/http://www.buyerleverage.com/index.html>.*

(Continued)

*Primary Examiner* — John Hayes
*Assistant Examiner* — John M Winter
(74) *Attorney, Agent, or Firm* — Lowenstein Sandler LLP (57) ABSTRACT

A social networking site host includes, in a user's profile, information that has been attested to and verified by both the user and an independent verifier. The independent verifier is an accepted authority with direct knowledge of the information. Both the user and verifier attest to the information by digitally signing the information and including the digital signature with the information. The host or visitors to the social networking site can authenticate the information by using both digital signatures. By authenticating the information, visitors and users viewing information on the social networking site can assume that the information is trusted and accurate.

16 Claims, 6 Drawing Sheets

(56) References Cited

U.S. PATENT DOCUMENTS

| | | | |
|---|---|---|---|
| 2005/0160042 A1* | 7/2005 | Russell et al. | 705/50 |
| 2005/0177750 A1* | 8/2005 | Gasparini et al. | 713/201 |
| 2007/0118732 A1* | 5/2007 | Whitmore | 713/155 |
| 2007/0174406 A1* | 7/2007 | Morris | G06F 21/51 709/207 |
| 2007/0185856 A1* | 8/2007 | Mittal | G06F 17/30654 |
| 2007/0244833 A1* | 10/2007 | Camenisch | G06F 21/33 705/71 |
| 2009/0036164 A1* | 2/2009 | Rowley | 455/558 |

OTHER PUBLICATIONS

Home Page, www.kaboodle.com. [Online]. Kaboodle, Inc., Feb. 27, 2007. Retrieved from the Internet: <URL: http://web.archive.org/web/20070227164915/http://www.kaboodle.com>.*

"DomainKeys Identified Mail," Wikipedia, Sep. 15, 2006. Retrieved from the Internet: <URL: http://web.archive.orq/web/20060915081859//http://en.wikipedia.orq/wiki/DomainKeys_Id . . . >.*

"Gmail", Wikipedia, Dec. 18, 2006. Retrieved from the Internet: <URL: http://web.archive.org/web/20061218133545/http://en.wikipedia.org/wiki/Gmail>.*

"Yahoo! Mail," Wikipedia, May 15, 2006. Retrieved from the Internet: <URL: http://web.archive.org/web/20060525011606/http://en.wikipedia.org/wiki/Yahoo_Mail>.*

Home Page, www.yodlee.com. [Online]. Yodlee, Inc. [Retrieved on Mar. 17, 2009] Retrieved from the Internet: <URL: http://www.yodlee.com>.*

* cited by examiner

PROVIDING INDEPENDENT VERIFICATION OF INFORMATION IN A PUBLIC FORUM

FIELD

The present invention relates to online services and communications tools.

BACKGROUND

Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like. Additionally, the social networking sites allow users to present personal profiles of themselves to visitors of the social networking sites.

Unfortunately, visitors to the social networking sites have no way to determine if the information contained therein is authentic and accurate. Typically, the users place information in the social networking sites without providing any type of independent verification of the information. Accordingly, all the information contained therein is self-asserted and unverified. As such, visitors to the social networking sites may not be able to trust the information contained therein. This prevents visitors to the social networking sites from using the information to verify important personal information such as employment history or education. Accordingly, it may be desirable to provide methods and systems that provide information in the social network which is independently verified.

BRIEF DESCRIPTION OF THE DRAWINGS

The accompanying drawings, which are incorporated in and constitute a part of this specification, illustrate embodiments of the disclosure and together with the description, serve to explain the embodiments. In the figures.

DESCRIPTION OF THE EMBODIMENTS

Embodiments of the present disclosure concern methods and systems for providing independently verified information in a public forum. In particular, a social networking site host includes, in a user's profile, information that has been attested to and verified by both the user and an independent verifier. The independent verifier is an accepted authority with direct knowledge of the information. Both the user and verifier attest to the information by digitally signing the information and including the digital signature with the information. The host or visitors to the social networking site can authenticate the information by using both digital signatures. By authenticating the information, visitors and users viewing information on the social networking site can assume that the information is trusted and accurate.

Reference will now be made in detail to the exemplary embodiments of the invention, which are illustrated in the accompanying drawings. Wherever possible, the same reference numbers will be used throughout the drawings to refer to the same or like parts.

Figure 1:
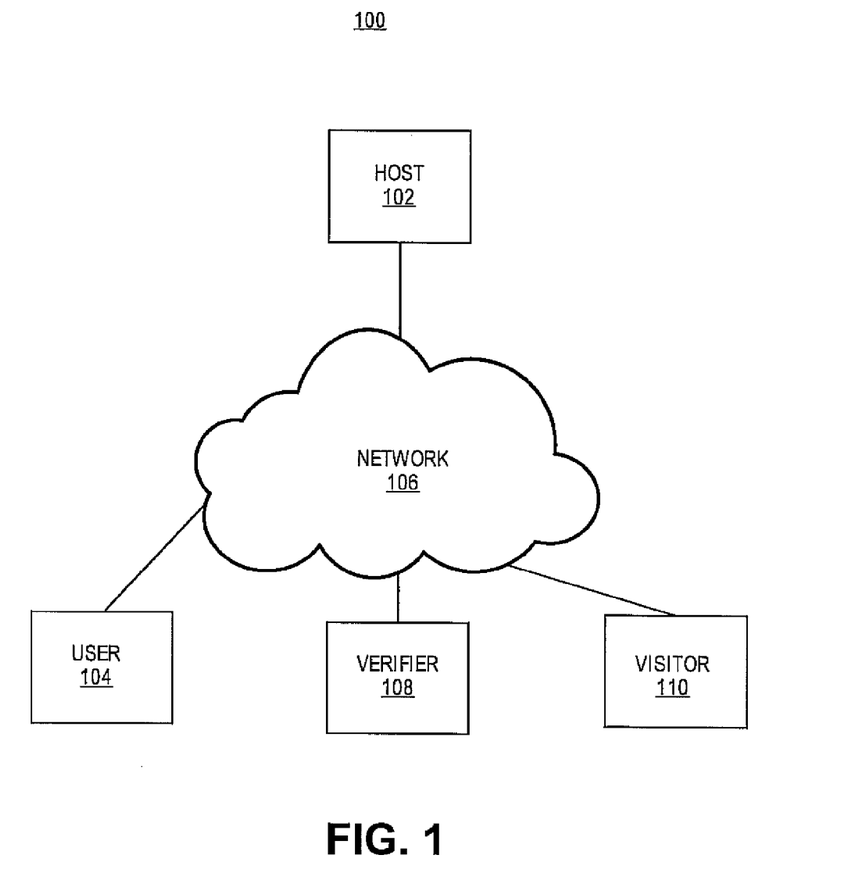
FIG. 1 is a diagram illustrating a system consistent with embodiments of the present disclosure.

FIG. 1 is a block diagram illustrating a system 100 that is consistent with the embodiments of the present disclosure. As shown, the system 100 may comprise one or more of a host 102, user 104, network 106, verifier 108, and visitor 110. In general, system 100 may be implemented on a widely available data network, such as the Internet. For example, system 100 may be implemented as a combination website and application that enables users and visitors to participate in a public forum, such as social networking site, maintained by host 102. These components will now be generally described.

Host 102 serves as a social network service and stores, manages, and provides access to the social networking site. In general, host 102 is essentially a website host and application service that stores, manages, and publishes information shared by users 104, as well as user profiles and social network information. Host 102 may be hosted as a public social networking site, similar in fashion to a service, such as MYSPACE or linkedin. In addition, host 102 may provide various application programming interfaces that have an open specification so that anyone can create an interface. Further, host 102 may create, authenticate, and incorporate independently verified information of user 104 into the social networking site.

Host 102 may be implemented using a variety of devices and software. For example, host 102 may be implemented as a website running on one or more servers that support various application programs and stored procedures.

User 104 provides an interface for creating and updating a profile in the social networking site maintained by host 102. User 104 may register with host 102 and create a profile in the social networking site. User 104 may post information on the social network site including independently verified information. For example, user 104 may create a profile in which user 104 includes personal information, such as biographic information, employment history, and education.

Verifier 108 provides an interface for an entity to provide independent verification of information in the social networking site. Verifier 108 may be an accepted authority of the information to which verifier is providing verification. For example, if a user would like to provide verified employment history, verifier 108 may be the past or present employer of user 104. Verifier 108 may be capable of verifying information from user 104 and providing an attestation, such as a digital signature, to the information.

Visitor 110 provides an interface for viewing a profile in the social networking service maintained by host 102. Visitor 110 may access the social networking site and view information about user 104 of the social network site. Visitor 110 may also authenticate the independently verified information in a user 104 profile.

User 104, verifier 108, and visitor 110 may be implemented using a variety of devices and software. For example, user 104, verifier 108, and visitor 110 may be implemented on a personal computer, workstation, or terminal. In addition, user 104, verifier 108, and visitor 110 may run under an operating system, such as the LINUX operating system, the MICROSOFT WINDOWS operating system, and the like. User 104, verifier 108, and visitor 110 may also operate through an Internet browser application, such as FIREFOX by Mozilla, INTERNET EXPLORER by Microsoft Corporation, or NETSCAPE NAVIGATOR by Netscape Communications Corporation.

One skilled in the art will also recognize that user 104, verifier 108, and visitor 110 may be implemented with various peripheral devices, such as a display, one or more speakers, and other suitable devices. User 104, verifier 108, and visitor 110 may also be implemented with various peripherals for accepting input from a user, such as a keyboard, a mouse, and the like. Although FIG. 1 shows one user 104, verifier 108, and visitor 110, system 100 may include any number of users 104, verifiers 108, and visitors 110. Further, one skilled in the art will realize that user 104 may also be a visitor 110 or verifier 108 and vice versa.

The components of system 100 may be coupled together via network 106. Network 106 may comprise one or more networks, such as a local area network, the Internet, or other type of wide area network. In addition, network 106 may support a wide variety of known protocols, such as the transport control protocol and Internet protocol ("TCP/IP") and hypertext transport protocol ("HTTP").

Figure 2:
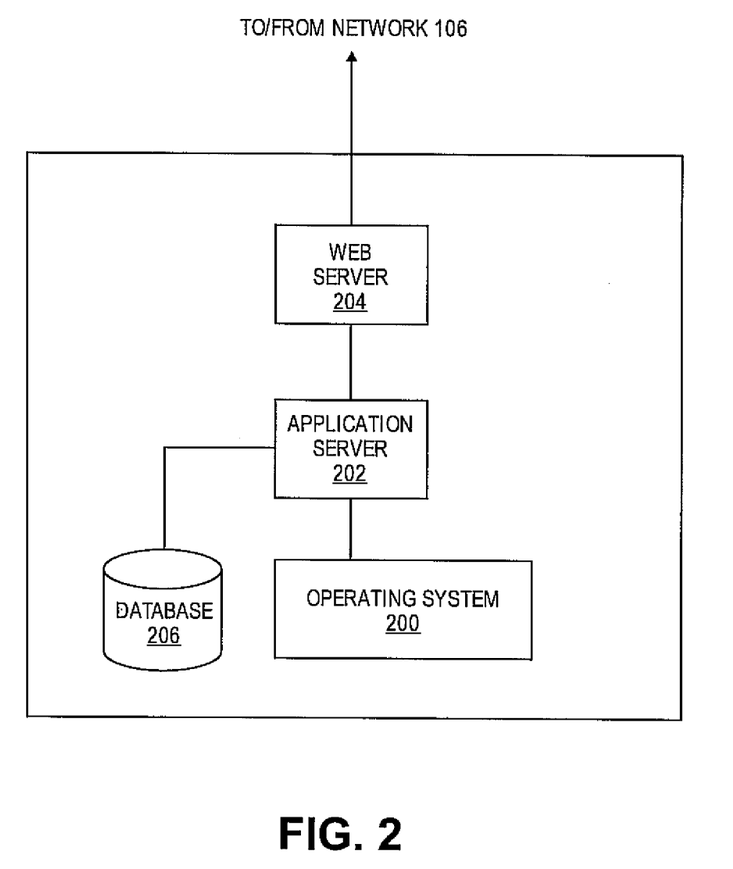
FIG. 2 is a diagram illustrating a host maintaining a social network consistent with embodiments of the present disclosure.

FIG. 2 is a diagram illustrating an exemplary architecture for host 102 that is consistent with embodiments of the present disclosure. As illustrated, host 102 may comprise an operating system 200, an application server 202, a web server 204, and a user database 206. These components may be implemented as software, firmware, or some combination of both, which may be loaded into memory of the machine embodying host 102. The software components may be written in a variety of programming languages, such as C, C++, Java, etc. These components will now be generally described.

Operating system ("OS") 200 is an integrated collection of routines that service the sequencing and processing of programs and applications running in host 102. OS 200 may provide many services, such as resource allocation, scheduling, input/output control, and data management. OS 200 may be predominantly software, but may also comprise partial or complete hardware implementations and firmware. Well-known examples of operating systems that are consistent with the principles of the present invention include the Linux operating system, the UNIX operating system. In addition, OS 200 may operate in conjunction with other software, such as an application server, such as JBoss, to implement various features of open host 102.

Application server 202 provides the logic for analyzing and managing the operations of host 102. As previously noted, application server 202 may be written in a variety of programming languages, such as C, C++, Java, etc.

For example, one responsibility of application server 202 may be managing the various identities of the users of the social networking site maintained by host 102. Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may here provide various search features. For example, application server 202 may allow users to search for other users based on various criteria, such as age, gender, school, etc. Application server 202 may also allow searches for various resources, such as email addresses, topics, links, etc.

Application server 202 may further create, incorporate, and authenticate independently verified information. Application server 202 may allow users to upload independently verified information and incorporate the independently verified information into the user's profile. Application server 202 may also authenticate the independently verified information. For example, application server 202 may provide an asymmetric cryptographic system to create and authenticate digital signatures contained in the independently verified information.

Web server 204 provides interface, access, and communication to the social networking site. Such communications may be based on well-known protocols and programming languages, such as HTTP, TCP/IP and Java. Interfaces provided by web server 204 may be implemented using well known Internet technologies, such as web pages, which are well known to those skilled in the art.

User database 206 maintains information identifying users 104. User database 206 may be implemented using well known database technology, such as relational databases, or object oriented databases.

For example, user database 206 may include information indicating one or more operating systems and applications installed on users 102 as well as services subscribed to by users. User database 206 may also comprise information related to authenticating a user determining the respective rights of a user relative to other users. User database 206 may further include information that indicates the permissions and delivery of the information to user 102. Other information that may be included in user database 206 may comprise information, such as system and individual permissions of user 102 on the social network site, activation keys, registration information, public cryptographic keys of the users, visitors and verifiers, and payment information (such as credit card information).

Furthermore, user database 206 may include other information related to the manner in which open host 102 communicates with users 104. For example, this information may relate to periodicity of notifications, email addresses, format of the information, and the like. User database 206 may include data structures to log the activities and transactions of its users. Activities, such as recent links, history of operations, etc., that may be logged in user database 206 are well known to those skilled in the art.

Figure 3:
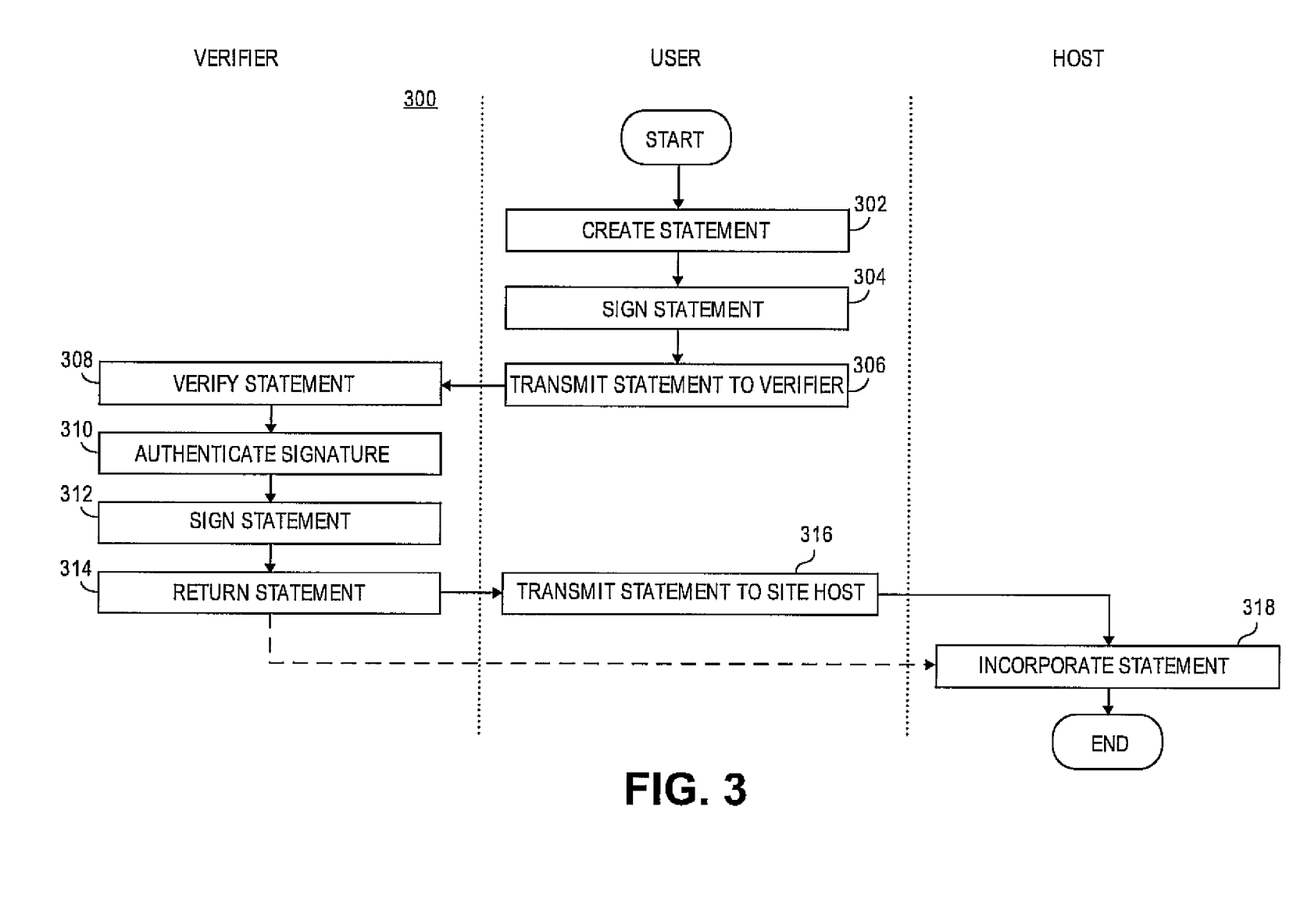
FIG. 3 is a flow diagram illustrating a method for providing independently verified information consistent with embodiments of the present disclosure.

As mentioned above, host 102 may provide verifiable and accurate information by allowing user 104 to include information in public forum, such as a social networking site, that has undergone independent verification and that includes attestation of the independent verification. FIG. 3 is a flow diagram illustrating a method 300 in which user 104 acquires the independent verification and host 102 manages the verified information. Method 300 may be performed in system 100 by host 102, user 104, and verifier 108.

Method 300 begins with user 104 creating a statement to be verified and posted on the social networking site maintained by host 102 (stage 302). The statement may contain any type of information about user 104 that may be useful when independently verified. For example, user 104 may create a statement that includes employment information. To be useful to visitors of the social networking site, the employment information may need to be verified independently.

After creating the statement, user 104 signs the statement (stage 304). User 104 may attest to the statement by signing the statement using any type of digital signing process, such as an asymmetric cryptographic digital signature process. For example, if user 104 utilizes an asymmetric cryptographic digital signature, user 104 may apply a transform to the statement, such as a hash. Then, user 104 may encrypt the transformed statement with user 104 private cryptographic key to create the digital signature. User 104 may then append the digital signature to the statement.

After signing the statement, user 104 transmits the statement with the attestation to verifier 108 (stage 306). User 104 may transmit the statement to verifier 108 via network 106. As mentioned above, verifier 108 may be any entity that can independently verify the information contained in the statement. For example, if the statement contains user 104 employment information, verifier 108 may be user 104 past or present employer.

After receiving the statement, verifier 108 verifies the information contained in the statement (stage 308). Verifier 108 may verify the information by comparing the information in the statement with its records.

Optionally, verifier 108 may authenticate user 104 attestation, such as a digital signature, appended to the statement (stage 310). By authenticating the attestation, verifier 108 may confirm that the statement was sent from the correct user 104. Additionally, by authenticating the attestation, verifier 108 may confirm that the statement has not been altered.

If a digital signature is utilized, verifier 108 may authenticate user 104 digital signature by performing the authentication method for the particular type of digital signature. For example, if user 104 signs the statement using an asymmetric system, verifier 108 may authenticate the digital signature by retrieving user 104 public key. User 104 public key may be included with the statement. Alternatively, user 104 public key may be maintained and retrieved from a key authority. Also, user 104 public key may be requested from user 104 or host 102.

After retrieving user 104 public key, verifier 108 applies the public key to the digital signature. By applying the public key, verifier 108 recovers the transformed statement, for example the hashed statement. Verifier 108 then applies the same transform to the statement to be authenticated and compares it to the recovered transformed statement.

If the statement verifies, verifier 108 attests to the statement by signing the statement (stage 312). If the statement does not verify, verifier 108 may inform user 104 of the lack of authentication (not shown). Similar to user 104, verifier 108 may attest to the statement by signing the statement using any type of digital signing process, such as an asymmetric cryptographic digital signature process.

For example, if verifier 108 utilizes an asymmetric cryptographic digital signature, verifier 101 may apply a transform, such as a hash, to the statement including user 104 digital signature. Then, verifier 108 may encrypt the transformed statement with verifier 108 private cryptographic key to create verifier 108 digital signature. Verifier 108 may then append the digital signature to the statement including user 104 digital signature.

After signing the statement, verifier 108 returns the statement with both attestations to user 104 (stage 314). Alternatively, verifier may return the statement with both attestations directly to host 102. Verifier 108 may return the statement via network 106. If the statement is returned to user 104, user 104 transmits the statement to host 102 (stage 316). User 104 may transmit that statement via network 106.

Once host 102 receives the statement with attestations of both the verifier and user, host 102 may incorporate the statement in the social networking site (stage 318). Host 102 may incorporate the information by including the statement in user 104 personal profile. Host 102 may display both attestations, such as digital signatures, visually next to the statement. Additionally, host 102 may embed the attested statement itself in an html tag that is not normally visible but is detected by the browser.

Method 300 was described about with user 104 creating and attesting to the statement. Nonetheless, user 104 may provide information to be independently verified to host 102. In such a case, host 102 may create and attest to a statement containing the information employing the same method employed by user 104.

The signed statement may be utilized in several different ways to show the authenticity of the information contained in the statement. Host 102 may authenticate both the signatures of the verifier and user prior to displaying the statement. Host 102 may then indicate in user 104 profile that the information has been independently verified. Additionally, host 102 may authenticate both signatures upon request by a visitor 110 to the social networking site. Further, host 102 may allow visitor 110 to download the signed statement with both attestations and verify the signatures personally.

Figure 4:
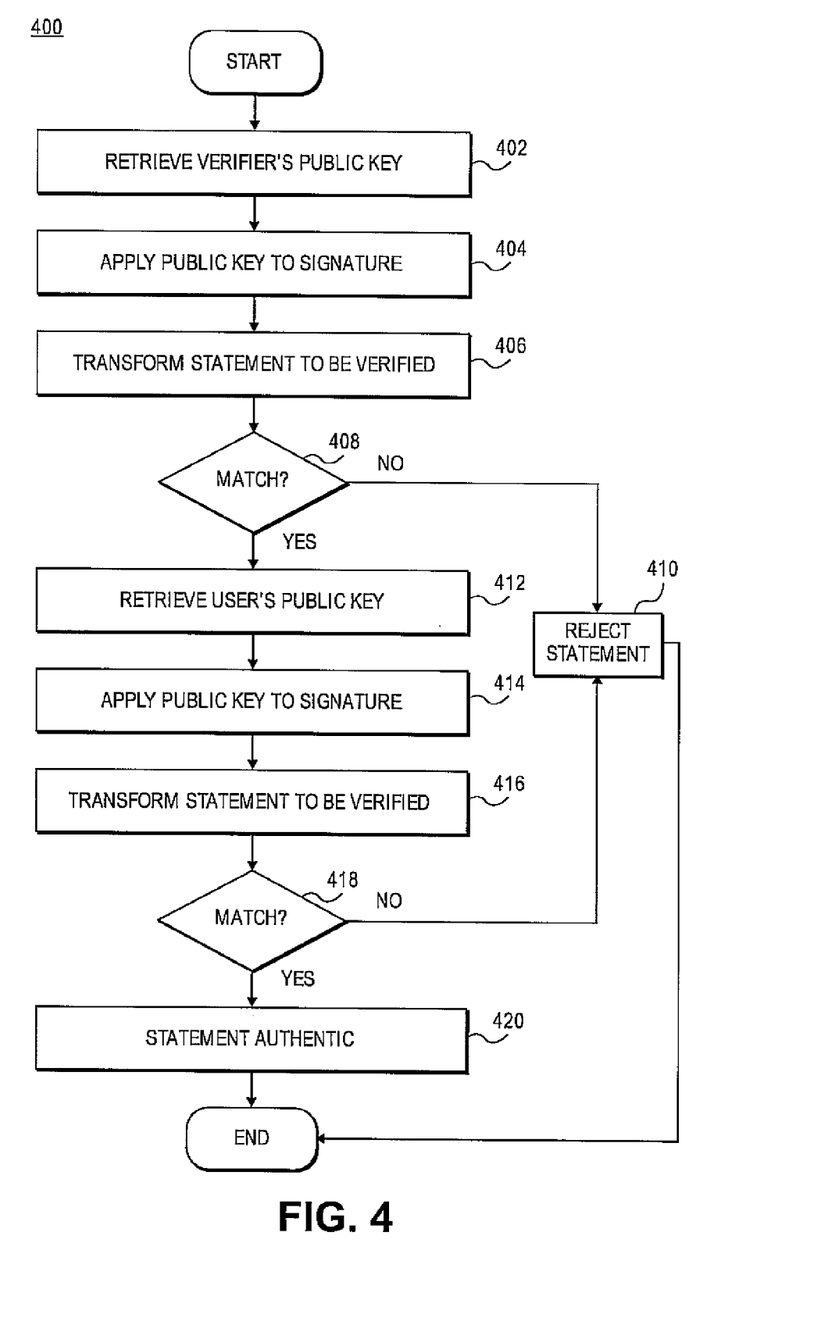
FIG. 4 is a flow diagram illustrating a method for authenticating independently verified information consistent with embodiments of the present disclosure.

FIG. 4 is a flow diagram illustrating a method 400 by which the statement with both signatures may be authenticated. Method 400 will be referenced with regard to host 102 performing the authentication. One skilled in the art will realize that host 102, user 104, verifier 108, or visitor 110 may perform the authentication.

Method 400 begins with host 102 retrieving verifier 108 public key (stage 402). Verifier 108 public key may be stored at host 102. Likewise, Verifier 108 public key may be retrieved directly from verifier 108. Additionally, verifier 108 public key may be maintained at a key authority.

After retrieving the public key, host 102 applies the public key to verifier 108 digital signature (stage 404). By applying the public key, host 102 recovers the transformed statement, such as the hashed statement.

Host 102 then applies the same transform, such as a hash, to the statement to be verified (stage 406) and compares it to the recovered transformed statement (stage 408). If the statements match, host 102 considers verifier 108 digital signature authentic. If not, host rejects the statement as being invalid (stage 410).

Next, host 102 authenticates user 104 digital signature. Host 102 retrieves user 104 public key (stage 412). User 104 public key may be stored at host 102. Likewise, user 104 public key may be retrieved directly from user 104. Additionally, user 104 public key may be maintained at a key authority.

Then, host 102 applies the public key to user 104 digital signature (stage 414). By applying the public key, host 102 recovers the transformed statement, such as the hashed statement.

Host 102 then applies the same transform, such as a hash, to the statement (416 and compares it to the recovered transformed statement (stage 418). If the statements match, host 102 considers user 104 digital signature authentic and accepts the statement as trusted and accurate (420). If not, host 102 rejects the statement as being invalid (stage 410).

Figure 5:
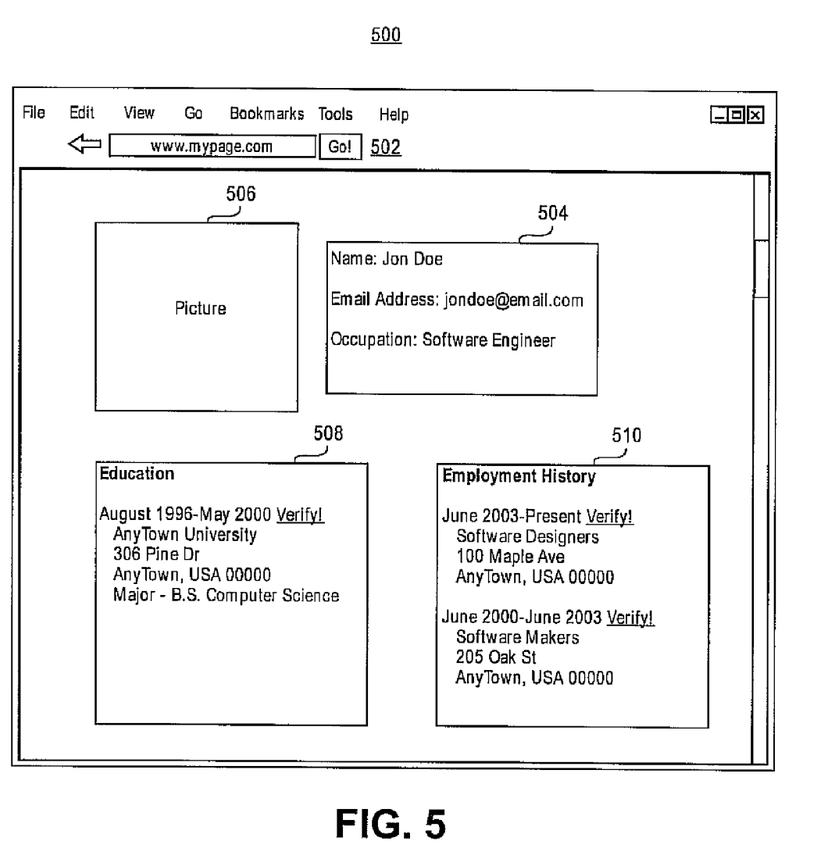
FIGS. 5 and 6 are diagrams illustrating an exemplary webpage consistent with embodiments of the present disclosure.
Figure 6:
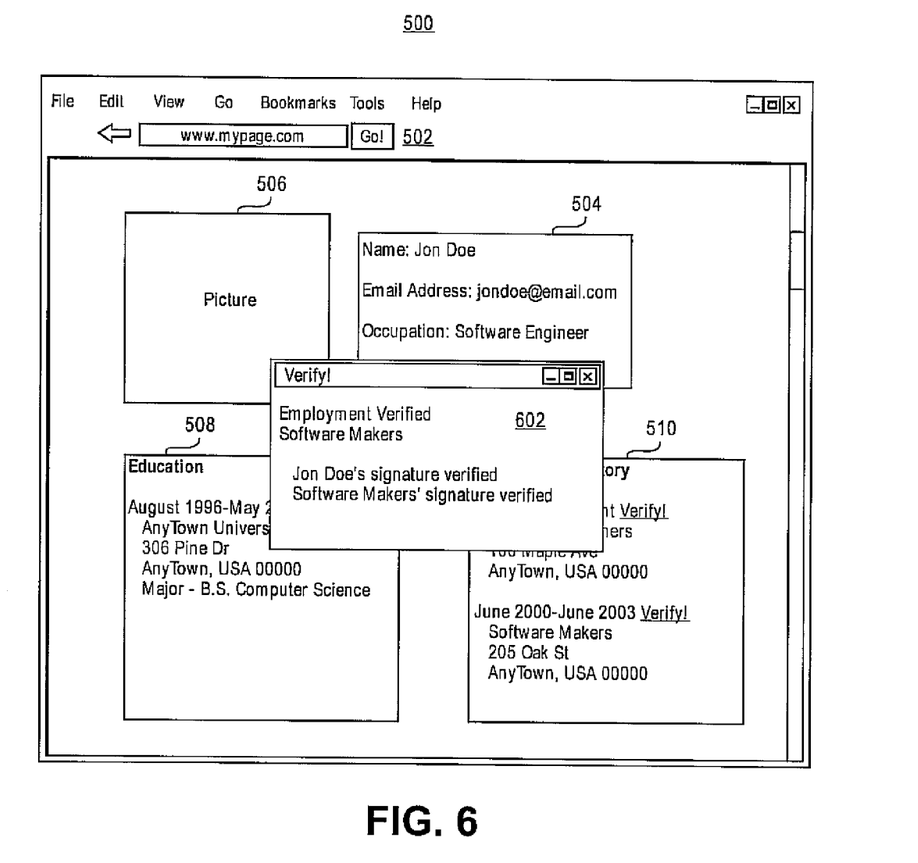

As mentioned above, host 102 maintains a social networking site in which users may share information which has been independently verified. FIGS. 5 and 6 are diagrams illustrating an exemplary social networking webpage 500 consistent with embodiments of the present disclosure. Webpage 500 may be created by user 104 and maintained by host 102. Visitors 410 may view webpage 500 using any well-known browsers by entering the web address in field 502.

As illustrated in FIG. 5, webpage 500 displays information about user 104. Webpage 500 may include biographically data 504 about user 104 and a picture 506. Webpage 500 also includes history information about user 104. For example, webpage 300 includes employment information 508 and educational information 510. Since the history information is valuable if independently verified, user 104 or host 102 may acquire verification by a verifier 108 with knowledge. For example, user 104 or host 102 may acquire verification according to method 300 described above.

As illustrated in FIG. 6, to authenticate the information, a visitor 106 may select a verify link embedded in employment information 508. In response, host 102 authenticates the information according to method 400 described above. If the statement authenticates, host 102 displays a message 602 notifying visitor 106.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   maintaining, by a host server, a plurality of profiles on a public forum of a networking site, wherein each of the plurality of profiles correspond to one of a plurality of users;
   receiving, by the host server;
      a statement comprising personal information of a user, wherein the personal information defines a relationship between the user and an entity and is independently verifiable by the user and the entity;
      a first attestation by the user that the personal information defining the relationship between the user and the entity is accurate, wherein the first attestation comprises a first digital signature created by encrypting the statement with a first private cryptographic key; and
      a second attestation by the entity that the personal information defining the relationship between the user and the entity is accurate, wherein the entity is an authority that has direct knowledge of the personal information and the second attestation comprises a second digital signature created by encrypting the statement with a second private cryptographic key;
   authenticating, by the host server, the first digital signature by retrieving a first public key and applying the first public key to the first digital signature;
   authenticating, by the host server, the second digital signature by retrieving a second public key and applying the second public key to the second digital signature;
   publishing, by a processor of the host server, the statement, a first indication of the first attestation, and a second indication of the second attestation on a profile of the user in the public forum on the networking site in response to the authenticating of the first digital signature and the authenticating of the second digital signature; and,
   providing access to the statement, the first indication, and the second indication on the profile to the plurality of users of the public forum via a data network, wherein the providing of the access comprises digitally authenticating, to the plurality of users, the relationship defined in the statement published in the public forum of the networking site.

2. The method of claim 1, wherein the first digital signature and the second digital signature are created using an asymmetric cryptographic system.

3. The method of claim 1, further comprising:
   retrieving the second public key, the second public key comprising a public cryptographic key of the entity; and
   retrieving the first public key, the first public key comprising a public cryptographic key of the user.

4. The method of claim 1, wherein the personal information comprises biographic information of the user.

5. The method of claim 1, wherein the publishing the statement in the public forum comprises incorporating the statement in a website associated with the user.

6. The method of claim 5, wherein the incorporating the statement comprises embedding the statement in a tag in the website.

7. A non-transitory computer readable medium having instructions that, when executed by a processor of a user device associated with a user, cause the processor to:
   create a statement comprising personal information of the user, wherein the personal information defines a relationship between the user and an entity and is independently verifiable by the user and the entity;
   create, by the processor of the user device, a first attestation that the personal information defining the relationship between the user and the entity is accurate, wherein the first attestation comprises a first digital signature created by encrypting the statement with a first private cryptographic key;
   acquire, by the user device from an entity device associated with the entity, a second attestation from the entity that the personal information defining the relationship between the user and the entity is accurate, wherein the entity has direct knowledge of the personal information and the second attestation comprises a second digital signature created by encrypting the statement with a second private cryptographic key; and
   provide, by the user device to a host server, the statement, the first attestation, and the second attestation for publication on a profile of the user in a public forum on a networking site, wherein the publication is in response to authenticating, by the host server, the first digital signature by retrieving a first public key and applying the first public key to the first digital signature and in response to authenticating, by the host server, the second digital signature by retrieving a second public key and applying the second public key to the second digital signature, wherein the host server is to maintain a plurality of profiles on the public forum of the networking site, each of the plurality of profiles corresponding to one of a plurality of users, wherein the host server is to digitally authenticate, to the plurality of users, the relationship defined in the statement published in the public forum of the networking site.

8. The non-transitory computer readable medium of claim 7, wherein the processor to create the first digital signature using an asymmetric cryptographic system.

9. The non-transitory computer readable medium of claim 7, wherein the personal information comprises biographic information.

10. A host server to maintain a social networking site, the host server comprising:
a memory to store:
a statement comprising personal information of a user, wherein the personal information defines a relationship between the user and an entity and is independently verifiable by the user and the entity;
a first attestation by the user that the personal information defining the relationship between the user and the entity is accurate, wherein the first attestation comprises a first digital signature created by encrypting the statement with a first private cryptographic key; and
a second attestation by the entity that the personal information defining the relationship between the user and the entity is accurate, wherein the entity has direct knowledge of the personal information and the second attestation comprises a second digital signature created by encrypting the statement with a second private cryptographic key; and
a processor, operatively coupled to the memory; the processor to:
maintain a plurality of profiles on a public forum of a networking site, wherein each of the plurality of profiles correspond to one of a plurality of users;
receive the statement, the first attestation, and the second attestation;
authenticate the first digital signature by retrieving a first public key and applying the first public key to the first digital signature;
authenticate the second digital signature by retrieving a second public key and applying the second public key to the second digital signature;
publish, by the processor, the statement, a first indication of the first attestation, and a second indication of the second attestation on a profile of the user in the public forum on the networking site in response to the processor authenticating the first digital signature and the second digital signature; and
provide access to the statement, the first indication, and the second indication on the profile to the plurality of users of the public forum via a data network, wherein providing of the access comprises digitally authenticating, to the plurality of users, the relationship defined in the statement published in the public forum of the networking site.

11. The host server of claim 10, wherein the processor is further to:
retrieve the first public key, the first public key comprising a public cryptographic key of the user; and
retrieve the second public key, the second public key comprising a public cryptographic key of the entity.

12. The non-transitory computer readable medium of claim 7, wherein the processor to provide the statement for publication in the forum comprises the processor to provide the statement for incorporation in a website associated with the user.

13. The host server of claim 10, wherein the first digital signature and the second digital signature are created using an asymmetric cryptographic system.

14. The host server of claim 10, wherein the personal information comprises biographic information of the user.

15. The host server of claim 10, wherein the publishing the statement in the public forum comprises incorporating the statement in a website associated with the user.

16. The host server of claim 15, wherein the incorporating the statement comprises embedding the statement in a tag in the website.

* * * * *